INVENTOR
H. A. SCHNEIDER
BY [signature]
ATTORNEY

Nov. 13, 1962 H. A. SCHNEIDER 3,064,241

DATA STORAGE SYSTEM

Filed Nov. 10, 1958 4 Sheets-Sheet 2

INVENTOR
H. A. SCHNEIDER
BY
ATTORNEY

INVENTOR
H. A. SCHNEIDER
BY
ATTORNEY

Nov. 13, 1962 H. A. SCHNEIDER 3,064,241

DATA STORAGE SYSTEM

Filed Nov. 10, 1958 4 Sheets-Sheet 4

INVENTOR
H. A. SCHNEIDER
BY
[signature]
ATTORNEY

United States Patent Office 3,064,241

Patented Nov. 13, 1962

3,064,241

DATA STORAGE SYSTEM

Herbert A. Schneider, Millington, N.J., assignor to Bell Telephone Laboratories, Incorporated, New York, N.Y., a corporation of New York Filed Nov. 10, 1958, Ser. No. 772,991
13 Claims. (Cl. 340—173)

This invention relates to synchronous data storage systems and more specifically to the automatic delay compensation of storage systems employing acoustic delay lines. It has for its general object the improvement and simplification of such systems.

Many synchronous data processing or storage systems use one or more acoustic delay lines for the storage of digital information. These delay lines usually include an ultrasonic delay line medium, such as fused silica or magnetostrictive wire, and associated input and output transducers for converting between acoustic and electrical signals. Barium titanate or X-cut quartz crystals are often employed as transducers. The transducer elements are normally mounted at opposite ends of the delay line path.

The information to be stored may be in the form of electrical pulses which are converted to ultrasonic pulses by one of the transducers. After a time period which depends upon the properties of the delay line, the ultrasonic pulses will have travelled the length of the delay line path where they are converted back into electrical pulses by the other transducer. Thus, a train of information pulses can be delayed for a specific time interval, after which they may be reapplied through suitable circuitry to the input of the delay line for recirculation. Ordinarily, the external electrical circuitry in the delay loop includes a source of timing or clock pulses and a pulse amplifier which serve to regenerate and retime the circulating pulses.

It is well known that the operational characteristics of most delay line materials are affected by temperature changes. Proper operation of the storage system depends upon exact synchronization of the delay line time and the frequency of the clock pulses. Heretofore, this has been principally accomplished by controlling the temperature of the delay line through the use of an oven which can be regulated for a particular range of temperatures.

As a result, a well insulated oven of considerable volume becomes necessary and a substantial amount of additional electric power is required. In consequence, the disposition of this additional power in a closely packed computer increases the cooling load, and the allowable range of operating temperatures is restricted.

In accordance with one known system, the problem of temperature sensitivity of acoustic delay lines has been alleviated by varying the clock frequency. In this previous system, one delay line was used exclusively for frequency corrections corresponding to variations of fractions of a digit period in the delay line capacity. However, temperature control was still required for major stabilization and the system had one less delay line to use for information storage.

In another known system, a different approach eliminating the temperature oven was proposed wherein the clock frequency remained constant and the timing information was carried by a double amplitude cycle pulse. Additional power was required in the transducers to handle pulses of varying magnitude, and the voltage and noise margins were reduced. The irregular spacing between groups of digital signals derived from storage also produced timing and synchronization difficulties.

Accordingly, one object of my invention is to eliminate the need for temperature control ovens used to maintain constant temperature of storage devices such as acoustic delay lines. This will, in turn, reduce the electric power and volume requirements of the storage device.

Another object of my invention is to remove the strict temperature limitations previously imposed upon delay line storage systems and to increase the range of operating temperatures over which the storage system can be properly operated.

A further object of this invention is to more fully utilize the available storage space.

The above and other objects are attained in illustrative embodiments of the present invention by using a single index pulse for control of temperature compensation circuitry. The same delay line is used for both storage and control pulses with the single control pulse circulating in the storage loop requiring but a single digit space in the loop. This permits automatic compensation of temperature-induced delay variations without the requirement for temperature control ovens and without sacrificing a delay line for use as a reference medium. All of the delay line space is thus made available for information storage except for the single digit space used by the control pulse in a single delay line. Additional delay lines may be employed in the data processing system to expand the capacity of the memory, and the timing of the entire system may be advantageously controlled by the circulation rate of this single control or index pulse.

The illustrative embodiments of my invention described hereinafter include a memory loop, a control loop and a start path. The memory loop of the delay type storage system consists of two distinct parts: (1) the ultrasonic delay portion having an ultrasonic delay line and associated input and output transducers, and (2) the electrical delay portion providing for access and control of the memory. The control loop in these embodiments includes a comparator, a direct-current amplifier and hold circuit, and a reactance tube oscillator. The start path includes the switching circuits and circuitry necessary for initially placing the system into operation.

In accordance with one aspect of the present invention, the memory loop and control loop are connected in such a manner as to allow the control circuitry to continuously monitor the integrity of the memory loop and compensate for any delay variations. Deviations from a desired loop delay are measured by the comparator which checks the arrival time of a control pulse, henceforth called an index pulse, circulating within the memory loop against the arrival time of a reference pulse supplied by a timer. The comparator issues a control signal to the direct-current amplifier and hold circuit which determines the frequency of the reactance tube oscillator. The variation in the frequency of the oscillator controls the pulse rate of the timer and compensates for variations in the delay time of the memory loop.

In accordance with another aspect of my invention, a simple check circuit is utilized to monitor the presence of the index pulse circulating in the memory loop. If the index pulse becomes lost, the check circuit provides an alarm, records the malfunction and corrects it by reinserting a new index pulse in the memory loop. This correction is made possible by the slow thermal response of the ultrasonic medium with respect to the index pulse sampling rate.

A further aspect of this invention is directed to the use of an alarm circuit merely as an indicator of malfunctions. Instead of reinserting an index pulse into the loop only when the need is indicated, a fresh index pulse is inserted into the loop every complete cycle. In accordance with this aspect of the present invention, the required control circuitry is reduced to its basic essentials.

Accordingly, it is a feature of my invention that a synchronous data processing system include an acoustic delay line, a source of timing signals, circuitry for inserting a reference pulse in the delay line, a comparison circuit for comparing the reference pulse with a pulse from the timing source to derive a control signal therefrom, control circuitry for utilizing the derived control signal to control the frequency of the timing source, and arrangements for storing additional pulse signals in the delay line.

It is a further feature of my invention that the control circuitry compensate automatically for deviations from the desired storage capacity regardless of cause, whether it be a change in temperature or a frequency or dimensional instability.

It is an additional feature of my invention that the control circuitry be controlled by a single pulse stored in one digit period of a delay line loop, with the remaining digit periods therein being utilized for information storage.

These and other objects and features of this invention will be better understood upon consideration of the following detailed description and the accompanying drawings, in which.

Figure 1:
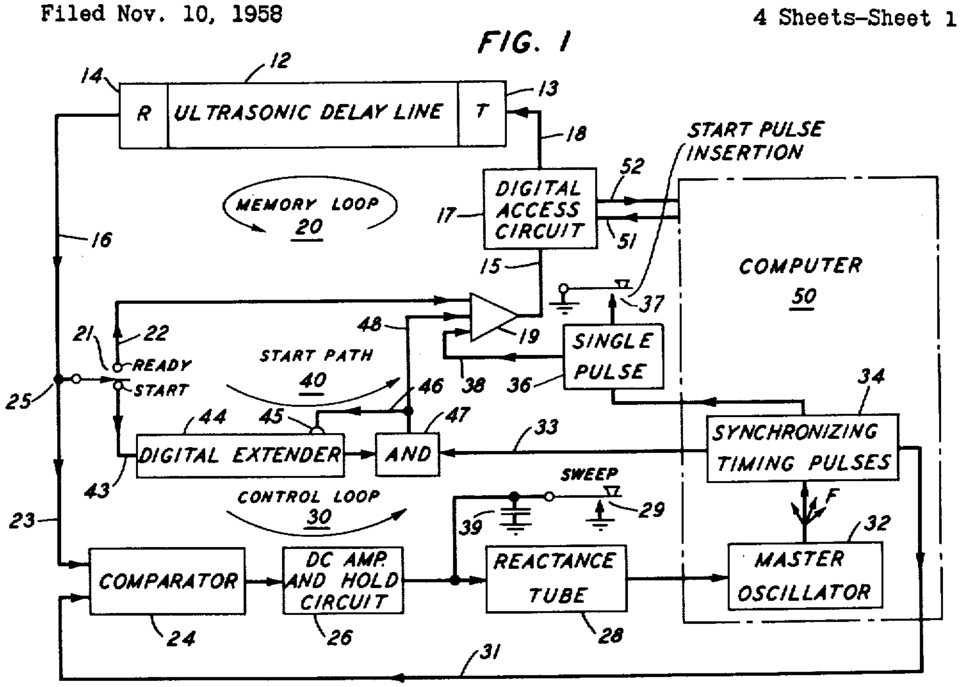
FIG. 1 is a block diagram of an illustrative embodiment in accordance with the principles of my invention.

Referring more particularly to the drawings, in which like parts are referred to by like reference characters, FIG. 1 shows a block diagram of an ultrasonic delay line storage circuit and associated circuits for control and synchronization. The memory loop 20 of FIG. 1 includes an ultrasonic delay portion and an electrical delay portion. The ultrasonic delay portion includes delay line 12, input transducer or transmitter 13, and output transducer or receiver 14. The electrical delay portion includes lead 16, transfer switch 21, lead 22, amplifier 19, lead 15, digital access circuit 17, and lead 18. The digital access circuit 17 receives information from and delivers information to the computer 50 on leads 51 and 52. Suitable digital access circuit arrangements for transferring binary information to and from delay line memory loops are disclosed in volumes I and II of "A Functional Description of the EDVAC," University of Pennsylvania, Moore School of Electrical Engineering, Philadelphia, Pennsylvania, November 1, 1949, for example, and in the copending patent application of J. G. Tryon, Serial No. 474,659, filed December 13, 1954, now patent 2,950,461, issued August 23, 1960.

The ultrasonic delay line 12 may, by way of example, be a fused silica plate with a suitable reflection pattern. The transducers 13 and 14 may be of barium titanate ceramic, silver-plated and attached to the delay line 12 by a solder bond. The binary information to be stored in the delay line 12 is received by the transmitter 13 in the form of digital pulses on lead 18 and is converted to ultrasonic vibrations to travel the length of the delay line path. After a specific delay period determined by the properties of the fused silica delay line, the ultrasonic vibrations are received by the receiver 14 which converts them back into the form of electrical pulses. The digital pulses then traverse the remaining portion of the memory loop, the electrical delay portion, where they are delayed for an additional time period.

The control loop 30 of the circuit of FIG. 1 is connected to the memory loop 20 at connection point 25. The control loop includes the comparator 24, the direct-current amplifier and hold circuit 26, the reactance tube 28, and the master oscillator 32. The comparator 24 receives an index pulse on lead 23 from the memory loop 20 and a reference pulse on lead 31 from the source of synchronizing timing pulses 34. The source of synchronizing timing pulses 34 supplies timing pulses to the comparator 24 at periods of time separated by a predetermined number of digit time slots comprising a word group. This may be, for example, one timing pulse every twelve digit periods. The digit period time slots are determined by the frequency of the master oscillator 32, to which the frequency of the pulse source 34 is synchronized.

When the system is in operation, the frequency of the pulse source 34 is controlled by master oscillator 32 to maintain a fixed number of digit periods of storage in the delay loop in the following manner. The index pulse and the reference pulse are compared and the comparator 24 applies a control signal to the direct-current amplifier and hold circuit 26. The amplifier and hold circuit 26 converts the control signal to an appropriate steady voltage which is applied to the reactance tube 28, controlling its capacitance. The reactance tube 28 thus controls the frequency of the oscillator 32. The variable frequency signal generated by master oscillator 32 is applied to pulse source 34 to control the pulse rate thereof in a manner known in the art and accordingly compensates for any deviation from proper relationship between the index pulse and the reference pulse. As mentioned before, this deviation may result from temperature, frequency, or dimensional instabilities.

Once the circuit of FIG. 1 is operating, the feedback of the control loop will keep the system in balance despite wide disturbances. Initially, however, it may be necessary to place the system into operation when neither the temperature nor the frequency is known. It is clearly advantageous to be able to start the system without preliminary temperature or frequency measurements. For reasons which will be discussed hereinafter, in order for a control signal to be developed in the illustrative circuit of FIG. 1, the index pulse must at least partially coincide with the reference pulse. Further, the control signal must be well filtered to assure a stable clock frequency. In addition, every pulse within the memory loop 20, whether it is to be used for control or information, must be received by the digital circuitry reasonably well synchronized to a specific clock phase to assure reliable pulse regeneration.

For these reasons, a standard starting procedure is necessary for placing the system in operation. This starting procedure will be considered in three steps, each involving the manual operation of one of keys 29 or 37, or the operation of transfer switch 21. The start path 40 is shown in FIG. 1 to include the digital extender 44 and the AND circuit 47. As shown in FIG. 1, the output of the digital extender 44 is one of the inputs to the AND circuit 47. The other input to AND circuit 47 is obtained from pulse source 34. An example of one digital extender circuit is shown and described hereinafter in connection with FIG. 6 of the drawing. At this point, suffice it to say that a digital extender produces a train of output pulses when an input lead is energized. The train of pulses is halted by the receipt of a signal on a reset lead to the digital extender. The AND circuit, as is well known in the art, produces an output signal when all input leads are energized. The output of AND circuit 47 shown in FIG. 1 is connected through lead 46 to reset terminal 45 of digital extender 44 and via lead 48 to an input of amplifier 19. The start path 40 is connected to the memory loop 20 by the "start" contact of the switch 21 and by output lead 48 of AND circuit 47 to one of the inputs to amplifier 19. When switch 21 is operated from the "ready" contact to the "start" contact, lead 22 is disconnected from the memory loop 20 and start path 40 is connected in its place.

Considering now the three steps of the starting procedure, step one is initiated by depressing and releasing the start pulse insertion key 37. This connects ground potential to the single pulse generator 36 which inserts a start pulse into the system through amplifier 19 on lead 38. Any of the known forms of single pulse generators may be used for the single pulse generator 36. By way of example, such a generator might include a pulse regenerator responsive to appropriate timing signals from pulse source 34 and the manual input signal for producing a single output pulse. Suitable blocking circuits are provided to insure the transmission of but one output pulse, in spite of mechanical contact chatter.

The start pulse developed by the single pulse generator 36 passes through digital access circuit 17, input transducer 13, delay line 12, and output transducer 14. During this portion of the start procedure, the frequency of oscillator 32 is not yet properly related to the time required for the transmission of the initial pulse through the delay loop. The pulse then follows a conducting path established by lead 16, switch 21 in the "start" position and lead 43 to the input to digital extender 44. Upon receipt of the start pulse digital extender 44 initiates a pulse train which outgates, through AND circuit 47, the next subsequent timing pulse from source of synchronizing timing pulses 34. This outgated pulse resets the memory cell of digital extender 44 through lead 46 and reset terminal 45, and it supplies a new index pulse to the delay line through lead 48 to one of the inputs to amplifier 19.

Step two of the starting procedure may now be initiated by depressing sweep key 29 to discharge capacitor 39 to ground potential. This forces oscillator 32 to assume a frequency at the upper end of its operating range. When sweep key 29 is released, capacitor 39 proceeds to recharge toward a negative voltage. As capacitor 39 slowly charges, the oscillator 32 decreases in frequency correspondingly. The decrease in the oscillator frequency increases the length of each digit period and changes the number of digit periods of delay provided by delay line 12. Since the pulse source 34 is synchronized to the master oscillator 32, the frequency of pulse source 34 decreases in correspondence to the decreasing oscillator frequency. The arrival of the index pulse at point 25 and at lead 23 therefore shifts or precesses with respect to the time of arrival of the reference pulses applied to lead 31. Each time the index pulse circulates through the delay line 12, it is directed through point 25 and lead 23 to the comparator 24 to be compared with the reference pulse on lead 31 which is derived from the source of synchronizing timing pulses 34. The index pulse continues to precess as capacitor 39 slowly charges until the comparator 24 indicates an overlap between the index pulse and the reference pulse. When such an overlap occurs, the comparator 24 issues a control signal, as discussed in connection with the operation of the control loop, and the control loop 30 establishes a stable balance and operating point for the system.

Logically, now that synchronization has been achieved, step three of the operating procedure is to operate the transfer switch 21 from the "start" position to the "ready" position. In actual application, the transfer switch 21 may be advantageously an electronic digital switch capable of operating at a rate compatible with the speed of the computer circuitry. With the operation of the switch 21, the digital extender 44 and start path 40 are removed from the circuit and the memory loop is readied for information storage through the digital access circuit 17. It will be noted that this switching action is performed while the index pulse is circulating and without disturbing the synchronization achieved through steps one and two.

In the particular circuit of FIG. 1, a reference pulse was supplied to the comparator 24 once every twelve digit periods from the source of synchronizing timing pulses 34. This necessitates the reservation of every twelfth digit period in the memory loop 20 for possible use as an index pulse. More efficient use of the memory loop may be advantageously attained by using only one digit period of the total storage capacity of the memory loop for compensation control. This will be considered more fully below in connection with FIGS. 10 and 11.

For purposes of illustration, a particular fused silica ultrasonic delay line may be considered which has been ground to 1251 microseconds of delay at an ambient temperature of 65 degrees centigrade. The delay of this line changes inversely with temperature at a rate close to 1 microsecond per 10,000 microseconds of delay per degree centigrade. Thus, the delay at zero degrees centigrade is 1259 microseconds.

The delay, of the delay line alone, for other values of temperature may be found from the relationship:

$$D'=1259-0.125°T \qquad (1)$$

where D' is the delay of the ultrasonic delay line in microseconds and T is the value of temperature in degrees centigrade.

The electrical delay in this illustrative embodiment of the invention adds an additional 21 microseconds of delay. Since the electrical delay is substantially unaffected by temperature changes, the total memory loop delay at zero degrees centigrade is 1280 microseconds. The total memory loop delay is described for other values of temperature by:

$$D=1280-0.125T \qquad (2)$$

where D is the total memory loop delay in microseconds and T is the temperature in degrees centigrade.

Figure 2:
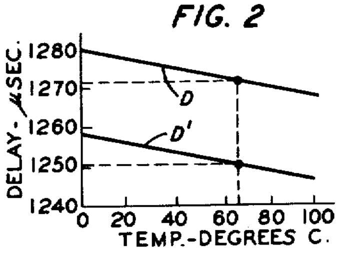
FIG. 2 is a plot showing the delay variation of a specific ultrasonic line with respect to the ambient temperature.

The above two relationships are shown in FIG. 2 of the drawings, indicating the range of variations which would be expected in the delay times of the particular line and memory loops described above. The curve labeled D represents the delay variations of the total memory loop, and the curve labeled D' represents the delay variations of the ultrasonic delay line alone. For example, we see that for a temperature of 65 degrees centigrade, the delay time of the memory loop is 1272 microseconds and the delay time of the delay line alone is 1251 microseconds.

Figure 3:
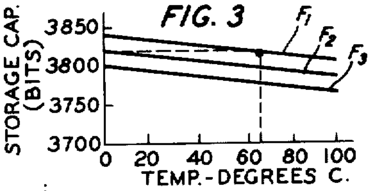
FIG. 3 is a plot of a family of frequency curves showing the storage capacity of a specific ultrasonic line as a function of the ambient temperature.

Of course, the number of digits, or bits, of information that can be stored in the memory loop depends upon both the delay time and the spacing between each bit. This can be shown as:

$$\text{Storage capacity}=\frac{\text{total loop delay}}{\text{bit period}} =\text{total loop delay}\times\text{frequency} \qquad (3)$$

which for the particular illustrative example above would be:

$$B=(1280-0.125T)F \qquad (4)$$

where B is the storage capacity of the memory loop in bits, F is the frequency of the oscillator 32 of FIG. 1 in megacycles per second, and T is the temperature in degrees centigrade. The plots of FIG. 3 shows the variations in the storage capacity B with respect to changes in temperature for three particular values of oscillator frequency. The top curve F1 of the three shown is for a frequency of 3,000,000 cycles per second, the middle curve F2 is for a frequency of 2,984,000 cycles per second, and the lower curve F3 is for a frequency of 2,968,000 cycles per second. We note, for instance, that for an operating temperature of 65 degrees centigrade and an oscillator frequency of 3,000,000 cycles per second, the storage capacity is 3816 bits.

From the above considerations, it is seen that the requirement for constant storage capacity may be met by shifting the frequency of the oscillator to compensate for changes in the temperature. The value of oscillator frequency for a particular constant storage capacity of 3816 bits in the memory loop of the illustrative example above would be:

$$F=\frac{3816}{1280-0.125T} \qquad (5)$$

where F is the frequency of the oscillator in megacycles per second and T is the temperature in degrees centigrade. This relationship is depicted graphically in FIG. 4 of the drawings, the dashed lines indicating that an operating temperature of 65 degrees centigrade requires an oscillator frequency of 3 megacycles per second.

Figure 5A:
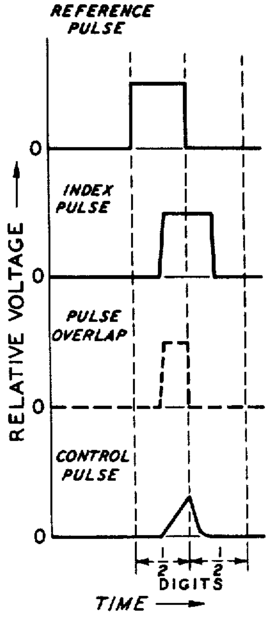
FIG. 5A is a graphical representation of the reference, index and control pulses in a particular embodiment.
Figure 5B:
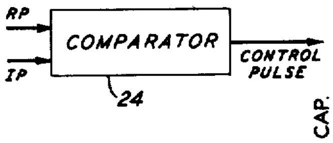
FIG. 5B is a block diagram representation of a comparator showing the input and output leads.
Figure 5C:
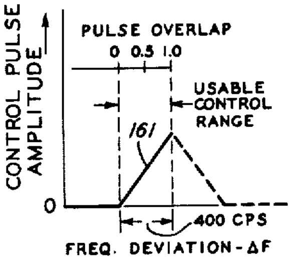
FIG. 5C is an enlarged graphical representation of the wave form of a control pulse obtained from the output of the comparator.

As has been noted in the description of FIG. 1, the comparator 24 continuously monitors the memory loop 20 by comparing an index pulse circulating in memory loop 20 with a reference pulse from source of timing pulses 34. FIG. 5B is a block diagram of the comparator 24 showing the two inputs, denoted by IP and RP, index pulse and reference pulse, respectively, and the resulting output control pulse. The wave forms and timing relationships of these three pulses are shown in FIG. 5A. Since the timing cycle of the reference pulse is fixed, any pulse overlap deviation is a direct measurement of a delay variation in the memory loop 20. In the illustrative circuit of FIG. 1, the index pulse must arrive at the comparator 24 within ±¼ digit period of the arrival of the reference pulse for a control pulse to be developed. Consideration of the timing relationships between the index and reference pulses of FIG. 5A clearly shows that a deviation of greater than one-fourth digit in either the positive or negative direction would result in zero pulse overlap. Thus no control signal would be developed. This is further shown in FIG. 5C. FIG. 5C indicates that the voltage of the control pulse is zero for zero overlap between the index pulse and the reference pulse, and increases to a maximum when the index pulse coincides fully with the reference pulse. As shown hereinafter, the controllable frequency range for this illustrative embodiment covers approximately 24,000 cycles per second. The frequency deviation of 400 cycles per second shown in FIG. 5C is the maximum memory loop error frequency occurring between the desired and actual frequencies of the index pulses. This is compensated for by the control loop. It will be further noted from FIG. 5C that the system uses only the left-hand slope 161 of the control pulse to provide a stable point of equilibrium.

Considering, by way of example, a delay line temperature increase of one degree centigrade, the ultrasonic line delay period decreases by 0.125 microsecond, reducing the storage capacity by three-eighths of a digit. Under these circumstances, the index pulse arrives at an earlier time with respect to the reference pulse than previous to the temperature increase. The result is a greater overlap between the index pulse and the reference pulse, with a correspondingly larger control pulse voltage. In turn, the oscillator frequency increases, increasing the total storage capacity to compensate for the decrease resulting from the temperature increase.

Figure 6:
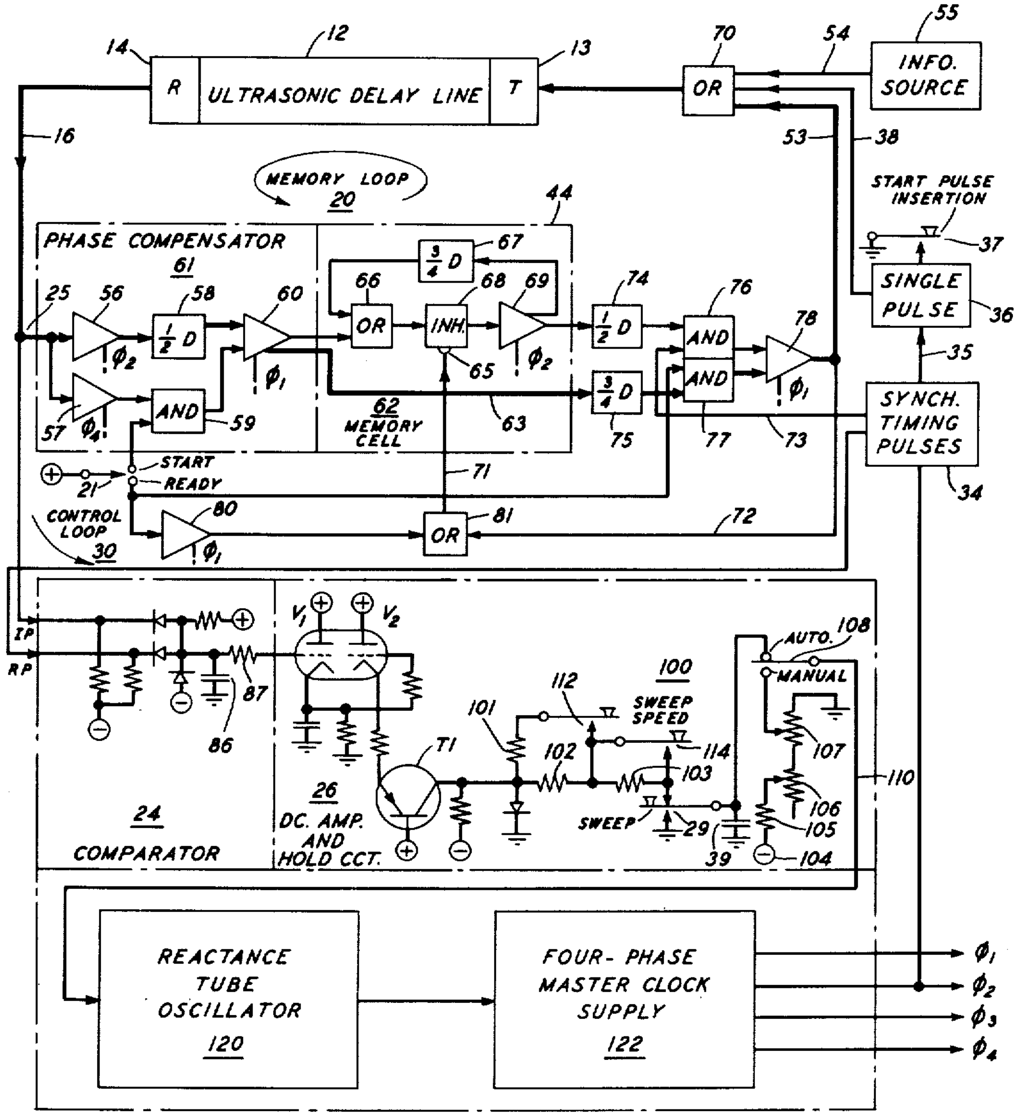
FIG. 6 is an additional block diagram of the illustrative embodiment of FIG. 1 showing the starting and controlling circuitry in greater detail.

FIG. 6 shows the starting and control circuitry of FIG. 1 in greater detail. Parts of the circuitry are shown in terms of the logic elements which are employed. These logic circuit elements may, of course, take any of the known forms. An article by J. H. Felker, entitled "Regenerative Amplifier for Digital Computer Application," which appears on pages 1584 through 1596 of the November 1952 issue of the Proceedings of the I.R.E., volume 40, No. 11, discloses representative logic elements which may be employed.

Some of the logic building blocks employed in FIG. 6 include the AND unit, which produces output signals when all inputs are energized; the OR unit, which produces output signals when any or all of the input leads are energized; and the inhibit unit, which has at least one normal input lead and an inhibiting lead marked by a small semicircle at the point where it is connected to the block representing the inhibit unit. A pulse applied to a single normal input lead is transmitted through the inhibit unit, while a pulse applied to the inhibiting input lead overrides other inputs and blocks output signals. Another type of logic building block used in FIG. 6 is the delay unit. The delay unit produces output signals which are delayed a particular period of time in relation to the input signals applied. This period of delay may be some fraction or multiple of a digit, or some combination thereof, and is indicated numerically in the block representing the delay unit. The time of operation of the pulse regeneration circuits is controlled by a master clock source having a cycle period corresponding to one digit period in the computer time frame of reference. Four phases of the clock, staggered in line by one-quarter digit period, are employed. With such an arrangement, one-quarter digit period of delay may be allowed for logic operation occurring between pulse regenerators.

The general layout in FIG. 6 is similar to FIG. 1, and like parts are referred to by like reference characters. The memory loop, including delay line 12, transmitter 13, and receiver 14, is in the upper half of FIG. 6 and includes digital extender 44, rather than showing it in a separate start path 40, as it is shown in FIG. 1. The memory loop path, once the system is in operation, is indicated by the heavier lines in FIG. 6. Beginning at receiver 14, the memory loop path may be traced through lead 16 and connection point 25 to amplifier 56; from there to amplifier 60 through one-half digit period delay unit 58; through lead 63 and three-fourths digit period delay unit 75 to AND circuit 77; from there through amplifier 78, lead 53, and OR circuit 70 to transmitter 13; and finally, through the delay line 12 back to receiver 14.

The digital extender 44 is shown consisting of a phase compensator 61 and a memory cell 62. Three regenerative transistor amplifiers 56, 57, and 60, an AND circuit 59 and a one-half digit period delay unit 58 are included in the phase compensator 61. Assuming a four phase master clock supply 122 for the data processing system, amplifier 56 is on clock phase two, amplifier 57 is on clock phase four, and amplifier 60 is on clock phase one. The inputs to amplifiers 56 and 57 are connected in parallel to connection point 25. Placing amplifier 56 on clock phase two and amplifier 57 on clock phase four separates their phases of operation by one-half digit period. When the start pulse is applied to the paralleled inputs to amplifiers 56 and 57, either or both of the amplifiers will be triggered. The output of amplifier 56 is connected to an input of amplifier 60 through one-half digit period delay unit 58; and the output of amplifier 57 is gated to an input of amplifier 60 through AND circuit 59. The regenerative amplifiers 56 and 57 produce one-quarter digit period of delay. Considering one-half digit delay 58 in series with amplifier 56 on clock phase two, regardless which of the amplifiers 56 and 57 is triggered when the start pulse is applied, the pulse developed by the phase compensator 61 will be in proper phase with the timing pulses. A second input to the AND circuit 59 is connected to the "start" terminal of the transfer switch 21. One of the outputs of amplifier 60 is used in the starting procedure only and is connected to the memory cell 62 of the digital extender 44. Another of the outputs of amplifier 60 is used in normal operation and is connected to one of the inputs of AND circuit 77 through lead 63 and a three-fourths digit period delay unit 75. The phase compensator 61 serves the purpose of delivering a pulse to the memory cell 62 of the digital extender 44, independent of the timing relationship between the start pulse and the clock pulses.

For purposes of illustration, consider an index pulse, one-half digit period wide, arriving at connection point 25 somewhere between phase one and phase two of the clock 122. Since the clock phases are separated by one-fourth digit period and the regenerative amplifiers have approximately one-fourth digit period delay, the index pulse will trigger the amplifier 56 on clock phase two. The output pulse from amplifier 56 will be delayed approximately one-fourth digit period by amplifier 56 and one-half digit period by delay unit 58. Thus, the pulse will be substantially in phase with clock phase one, whereupon it will trigger amplifier 60 on clock phase one.

Similarly, an index pulse arriving in such a phase relationship to trigger amplifier 57 on clock phase four will be delayed approximately one-fourth digit period by amplifier 57. Again, the pulse applied to amplifier 60 will be substantially in phase with phase one of clock 122 and will trigger amplifier 60. As long as the index pulse at connection point 25 is greater than one-fourth digit period wide, at least one of the amplifiers 56 or 57 will be triggered and the pulse applied to amplifier 60 will be substantially in phase with phase one of clock 122. Therefore, the pulse applied to OR circuit 66 and three-fourths digit period delay unit 75 will be in phase with clock phase two.

The memory cell 62 is a one bit memory consisting of a delay loop having a total delay of one digit period. The delay loop consists of three-fourths digit period delay unit 67, OR circuit 66, inhibit unit 68, and regenerative transistor amplifier 69 on clock phase two, all serially connected. As mentioned above, the pulse regenerator introduces one-fourth of a digit period of delay. The pulse from the phase compensator 61, in phase with clock phase two, is introduced into the one bit loop of memory cell 62 through one of the inputs to the OR circuit 66. This single pulse circulates in the memory cell loop, creating a train of digit period pulses available at the output of amplifier 69 substantially in phase with clock phase three. This train of pulses is transmitted to one of the inputs to AND circuit 76 through a one-half digit period delay unit 74. Timing pulses in phase with clock phase one are applied to a second input of the AND circuit 76 through lead 73 from the source of synchronizing timing pulses 34. Thus, the train of pulses from the digital extender 44 to the AND circuit 76 outgates the next subsequent timing pulse, to be introduced as an index pulse into the memory loop 20. Further, the outgated pulse resets the memory cell 62 via lead 72, OR circuit 81, and lead 71 to inhibit terminal 65 of inhibit unit 68.

The circuitry of the comparator 24 and the direct-current amplifier and hold circuit 26 is shown in the lower half of FIG. 6. It will be noted that the reactance tube 28 and the master oscillator 32 of FIG. 1 are included in two blocks in FIG. 6, one labeled "reactance tube oscillator" and designated by the reference numeral 120 and the other labeled "four phase master clock supply" and designated by the reference numeral 122.

The reactance tube oscillator 120 may be one of the many reactance tube oscillator circuits well known in the art. Examples of such circuits are disclosed in volume XXVIII, No. 4 of "The Bell System Technical Journal" in an article on page 601, entitled "Reactance Tube Modulation of Phase Shift Oscillators," by F. R. Dennis and E. P. Felch. The four phase master clock supply 122 may take the form of circuits known in the art for dividing a digit period pulse into four phase pulses, each separated by one-fourth digit period.

The comparator 24, as shown in FIG. 6, is a diode-capacitor AND-integrator circuit. This circuit has been made insensitive to pulse amplitude and repetition rate. Thus, the voltage on the capacitor 86 represents the pulse overlap only. The voltage on capacitor 86, the control voltage, is applied through resistor 87 to the double cathode-follower hold circuit V1 and V2. The resultant steady direct current is amplified by the transistor amplifier T1 and is applied through sweep speed arrangement 100, back contact of sweep key 29, "automatic" contact of selection switch 108, and lead 110 to reactance tube oscillator 120. Hence, as will be discussed more fully below in connection with FIGS. 7, 8 and 9, the output frequency of oscillator 120 is controlled and varied. The output of oscillator 120 is applied to the master clock supply 122 which generates the four clock phase pulses mentioned hereinbefore. The four clock phases are separated by one-fourth digit period. One of the phases, shown as phase two in FIG. 6, is applied to the timing pulses source 34 in a manner such that the output of pulse source 34 will be in phase with clock phase one.

Figure 4:
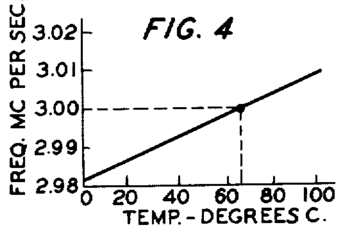
FIG. 4 is a plot of the variation of oscillator frequency necessary to maintain constant storage capacity with respect to ambient temperature.

Considering the foregoing temperature compensation circuits as applied to one specific embodiment of the invention, reference is made to the characteristics shown in FIGS. 2, 3 and 4. For a temperature of 25 degrees centigrade and an oscillator frequency of 3 megacycles per second, the memory loop storage capacity is 3831 bits. This is 15 bits more than the 3816 bits desired. As a result, the index pulse, after traveling through the delay line 12, arrives 15 bits, or 5 microseconds, after the reference pulse. The comparator 24 develops no control signal until the sweeping frequency of the reactance tube oscillator 120 has shifted 11.6 kilocycles per second. This corresponds to a decrease in storage capacity of 14¾ bits. From this instant on, the index pulse and reference pulse overlap begins and increases. The increasing control signal assumes control of the frequency, stabilizing it at 2.988 megacycles per second. This is a decrease of 12 kilocycles per second. The storage capacity of the memory loop 20 has been reduced the required 15 bits and the overlap between the index pulse and the reference pulse is approximately 50 percent.

The starting procedure and the operation and control of the circuit depicted in FIG. 6 are substantially the same as described in connection with FIG. 1. However, several additions and refinements have been made. A sweep speed arrangement 100 has been added to vary the exponential rate at which the capacitor 39 charges when the sweep key 29 is depressed and released. The sweep speed arrangement 100 includes resistors 101, 102, and 103, and keys 112 and 114. Either or both of the keys 112 and 114 may be operated, connecting the various resistors 101, 102 and 103 in the charging path of the capacitor 39, thus obtaining four separate values of sweep speed.

A selection switch 108 is shown in the upper right-hand corner of the direct-current amplifier and hold circuit 26. When the selection switch 108 is in the position shown in FIG. 6, on automatic, the compensation control proceeds in the manner hereinbefore described. Placing the switch 108 in the manual position, however, allows manual adjustment of the reactance tube oscillator output frequency. This manual control is accomplished through the use of resistor 105, source of negative potential 104, and the two variable resistance elements 106 and 107. Varying the resistance of elements 106 and 107 controls the voltage signal applied over lead 110 to the reactance tube oscillator 120. In this manner, the capacitance and thus the output frequency of oscillator 120 is controlled and varied. It should be noted at this point, however, that neither the sweep speed arrangement 100 nor the manual-automatic selection switch 108 is intended to limit my invention. They are shown herein for illustrative purposes only.

Information may be inserted into the memory loop 20 by information source 55 through lead 54 and OR circuit 70. Advantageously, for operational use of the memory loop 20, digital access circuitry, similar to the digital access circuit 17 of FIG. 1, may be located between lead 53 and the OR circuit 70.

Figure 7:
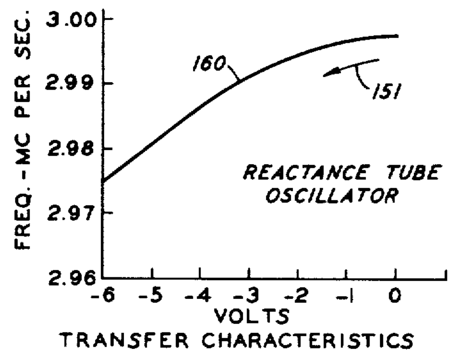
FIGS. 7 and 8 show the open loop transfer characteristics of the control circuitry.

FIG. 7 shows the open loop transfer characteristics 160 of the reactance tube oscillator 120 in the circuit of FIG. 6. Along the abscissa is plotted the output signal from the direct-current amplifier and hold circuit 26, which is transmitted through lead 110 in FIG. 6 to the input of the reactance tube oscillator 120. Along the ordinate axis is plotted the output frequency of oscillator 120 in FIG. 6 in megacycles per second. The arrow 151, moving to the left, indicates the direction of the forced sweep signal initiated by step two of the starting procedure, the actuation of the sweep key 29.

Figure 8:
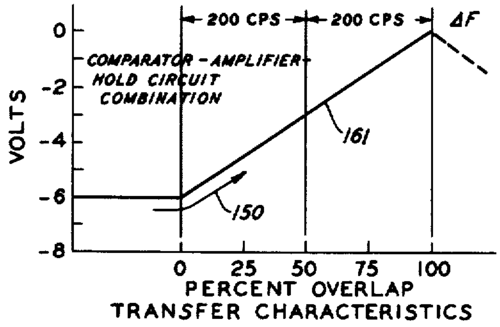

The transfer characteristics 161 of the comparator-amplifier-hold circuit combination is indicated by the plot in FIG. 8. The output signal from the amplifier-hold circuit 26 is shown as a function of the percent overlap between the reference and index pulses. The arrow 150, moving to the right, indicates the direction in which the control signal builds up. It will be recalled from the illustrative circuit that closing the sweep key 29 initially forces the grid of the reactance tube 28 to a zero level and the oscillator 32 to a frequency near the upper edge of the operating band. As the capacitor 39 charges toward a negative voltage, the control signal is building up positively from the negative voltage. Once the control signal voltage and the capacitor 39 voltage have become equal, no further voltage changes occur until the memory loop balance is upset by some disturbance.

Figure 9:
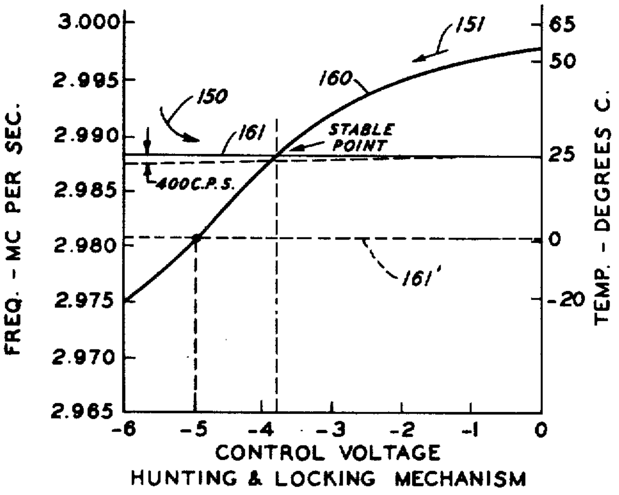
FIG. 9 is a plot showing the hunting and locking balance mechanism with the control loop closed.

The hunting and locking mechanism discussed in connection with FIG. 8 is plotted in FIG. 9 with the control loop closed. The characteristics 160 and 161 of FIGS. 7 and 8 are superimposed, with suitable scaling adjustments. In addition, the temperature in degrees centigrade is shown along the right-hand ordinate axis. Here again, the arrow 150 indicates the direction of control signal build-up. The arrow 151 again represents the direction of the forced sweep signal, this time in terms of oscillator output frequency variation. The system balances at the intersection of the two characteristics 160 and 161, which at ambient temperature is approximately in the center of the operating range.

Once the system is locked in, it retains its constant storage capacity. The voltage-frequency characteristic 161 in FIG. 9 moves up and down with temperature changes. The stable point for the system is always at the intersection of the two characteristics 160 and 161. For example, a temperature change from 25 degrees centigrade to zero degrees centigrade in the illustrative system shifts the voltage-frequency characteristic 161 down to the position designated 161', resulting in a frequency decrease of 7.2 kilocycles per second. The characteristic crossing and new stable point is seen to be at a control voltage of negative 5 volts.

Figure 10:
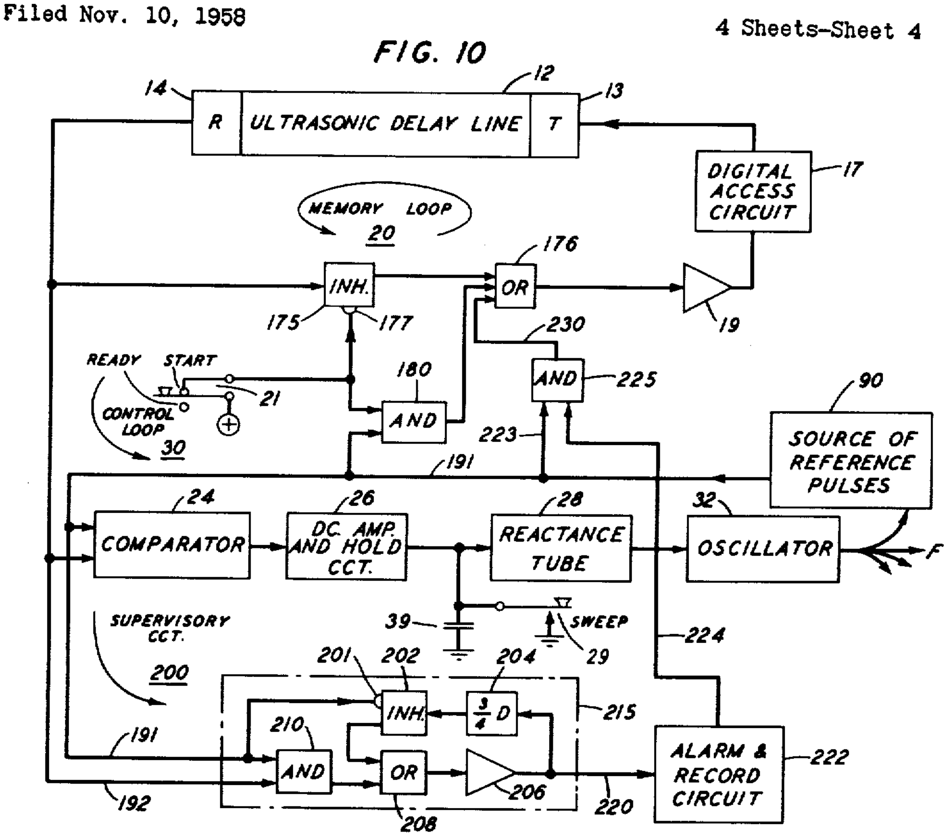
FIG. 10 is a block diagram of an additional illustrative embodiment of my invention showing a supervisory circuit to be used as an indicator of the memory loop's integrity.

As was mentioned above in connection with FIG. 1, if a reference pulse is made available once every cycle time, more efficient use is made of the memory loop because only one digit period is required for use by an index pulse for compensation control. This may be advantageously accomplished in the circuit of FIG. 1 through the use of suitable counting or frequency dividing circuits, and both a circuit and a start procedure simplification may be effected. The resultant circuit simplification is shown in FIG. 10. The new source of reference pulses is indicated by the block labeled with reference numeral 90, and includes the counting or frequency dividing circuits mentioned above. Readily apparent in FIG. 10 is the absence of the digital extender 44 and the single pulse generator 36 of FIGS. 1 and 6.

Consideration of the start procedure simplification, which consists of only two steps, will clarify the changes in the circuitry of FIG. 10. A reference pulse, occurring at periods of time substantially equal to the delay time of the memory loop 20, is applied to the comparator 24 and to the AND circuit 180 over lead 191. With switch 21 and sweep key 29 in the positions shown in FIG. 10, the first step of the new start procedure is to depress and release sweep key 29. It will be noted at this point that a pseudo index pulse is being fed into the delay loop once every cycle time through the AND circuit 180 and the OR circuit 176. Similar to the previous start procedure, the hunting and locking function, discussed in connection with FIGS. 8 and 9, begins upon release of key 29 to obtain a proper balance and a stable operating point.

Once a proper balance has been obtained, step two of the operating procedure, operation of switch 21, removes the pseudo index pulse source from the system by disabling the AND circuit 180. The operation of switch 21 also closes the memory loop 20 by removing the voltage from the inhibit terminal 177 of the inhibit unit 175. The memory loop 20 is now operational, with a single stored index pulse used as the sole controlling element.

In the lower half of FIG. 10 is a supervisory circuit 200 used to monitor the presence of an index pulse as a continuous indicator of the memory loop's integrity. If the index pulse becomes lost, the supervisory circuit 200 may advantageously control the operation of an alarm and record circuit 222. The alarm and record circuit 222 is also utilized to automatically insert a new index pulse into memory loop 20. The latter use for the alarm and record circuit 222 is made possible by the slow thermal response of the ultrasonic storage medium with respect to the index pulse sampling rate.

The supervisory circuit 200 includes detector circuit 215, alarm and record circuit 222, and AND circuit 225. The detector circuit 215 includes AND circuit 210, OR circuit 208, and amplifier 206, serially connected in this sequence. The output of the amplifier 206 is connected to an input of the OR circuit 208 through a three-fourths digit period delay unit 204 and an inhibit unit 202. The output of amplifier 206 is also connected to alarm and record circuit 222, suitable forms of which are well known in the art. Once each cycle, an index pulse is transmitted through lead 192 to an input to the AND circuit 210. Concurrently a reference pulse is applied via lead 191 to another input to AND circuit 210 and to the inhibit terminal 201 of the inhibit unit 202. The operation of the detector circuit 215 is quite similar to that of the memory cell 62 in FIG. 6. The AND circuit 210 generates an output pulse upon concurrent receipt of the index pulse and the reference pulse on leads 191 and 192. The output pulse initiates a train of pulses, one each digit period, on lead 220. Assuming at some time the index pulse becomes lost, the next subsequent reference pulse on lead 191 will be applied to terminal 201 of the inhibit unit 202, overriding the previously stored pulse. Thus, the output signal on lead 220 will cease, indicating the loss of the index pulse.

The alarm and record circuit 222, upon receiving indication of this loss over lead 220, provides a suitable alarm signal and records the loss. Further, a signal developed by circuit 222 is advantageously applied over lead 224 to AND circuit 225, whereupon the next subsequent pulse from source 90 over leads 191 and 223 is outgated. The outgated pulse from AND circuit 225 is inserted as a fresh index pulse into memory loop 20 over lead 230 and through OR circuit 176. Obviously, many other arrangements may be devised whereby new index pulses may be inserted in memory loop 20.

Figure 11:
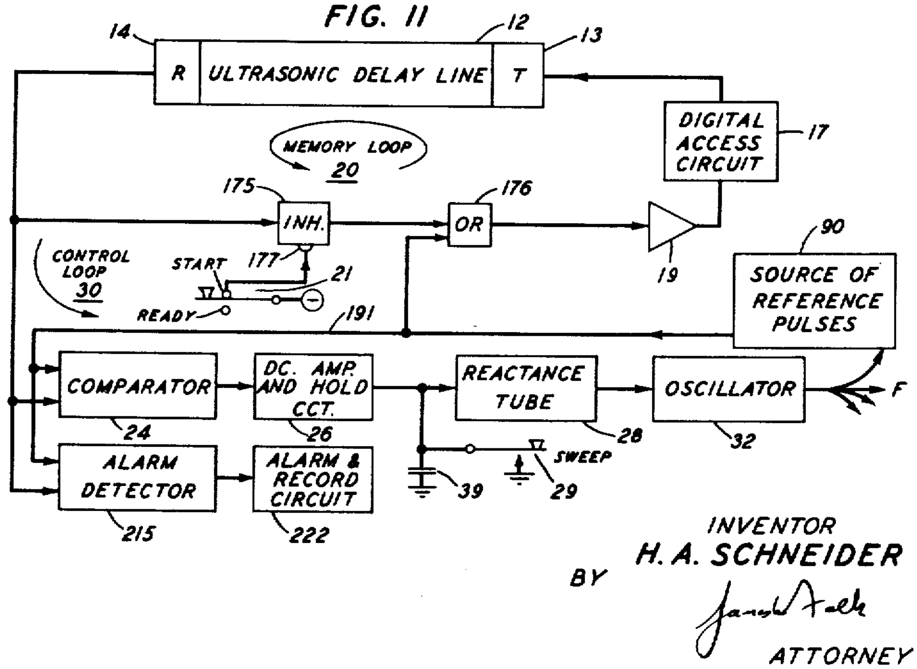
FIG. 11 is a block diagram of an alternative illustrative embodiment showing simplification of the starting circuitry.

A further simplification of the circuit may be advantageously attained by eliminating the correction feature of the supervisory circuit 200, and by inserting a fresh index pulse into memory loop 20 once every cycle time. FIG. 11 shows an embodiment of the invention in which this last alternative is accomplished. The starting procedure consists of two steps similar to those described above in connection with the circuit of FIG. 10. The second step, operation of switch 21, removes the voltage from inhibit terminal 177 of inhibit unit 175. Thus, the memory loop 20 will be closed and ready for information storage. Once every cycle time a reference pulse is applied to comparator 24, to alarm detector 215 and to OR circuit 176 over lead 191. The latter application of the reference pulse inserts a fresh index pulse into memory loop 20.

In FIG. 11 alarm detector circuit 215 may be similar to the circuit 215 shown in FIG. 10. In this instance, however, the output of the detector 215 is used to indicate the loss of an index pulse and to record the malfunction in alarm and record circuit 222. There is no need for correction because, as mentioned above, the source of reference pulses 90 inserts a fresh pulse into the memory loop 20 each cycle time.

The remaining circuity in FIGS. 10 and 11 is similar to that shown in FIG. 1 and discussed in greater detail hereinbefore in connection with FIG. 6. The digital access circuit 17 is connected to the computer in a manner similar to that shown in FIG. 1. Through this connection, information is transferred to and from the computer and the memory loop 20. Further, the sweep circuitry shown in detail in FIG. 6 is merely indicated by the sweep key 29 in FIGS. 10 and 11, but this is not to be regarded as excluding the associated sweep speed circuitry 100 of FIG. 6.

It is understood that the above-described arrangements are merely illustrative of the application of the principles of the invention. Numerous other arrangements may be devised by those skilled in the art without departing from the spirit and scope of the invention.

What is claimed is:

1. In a synchronous data storage system, a master source of periodic timing signals, a delay line for storing pulses, access circuit means for supplying pulses to said delay line in successive time slots having a spacing determined by said source of timing signals, means for initially inserting a single index pulse in said delay line, means for providing a periodic reference signal having a frequency of recurrence which is a submultiple of the frequency of the timing signals of said source, a comparison circuit for matching the index pulse from said delay line with said reference signal and deriving a control signal representing the magnitude and sign of the relative displacement in time of said index pulse and said reference signal, means for initially sweeping the frequency of said source to obtain overlap of said index pulse and said reference signal, means for subsequently controlling the frequency of said source in accordance with said control signal, and means for thereafter energizing said access circuit means to store additional pulses in said delay line.

2. The combination in accordance with claim 1 further including means for repeatedly circulating said pulses and said index pulse through said delay line, detector means for determining the presence of said index pulse in its proper time slot after each circulation through said delay line, and means controlled by said detector means for developing an alarm signal in the absence of said index pulse from its proper time slot.

3. The combination in accordance with claim 2 further comprising means controlled by said detector means for inserting a new index pulse in the proper time slot in said delay line.

4. In combination, a master source of periodic timing signals; a memory loop including an ultrasonic delay line, access circuit means for supplying and removing pulses to and from said delay line, and means for initially inserting an index pulse in said delay line; means for providing a periodic reference signal having a fixed frequency of recurrence which is a submultiple of the frequency of said source of timing signals; a control loop including a comparison circuit for deriving a control signal representing the relative displacement in time of said index pulse and said reference signal; means for initially sweeping the frequency of said source of timing signals to obtain overlap between said index pulse and said reference signal; and means for subsequently controlling the frequency of said master source in accordance with said control signal.

5. A self-synchronous delay storage system comprising a delay line, a master source of periodic pulses, a secondary source of periodic pulses derived from said master source and having a frequency which is a submultiple of the frequency of said master source, means for inserting an index pulse in said delay line, a comparison circuit for developing a control signal representing the relative time displacements of said index pulse and periodic pulses from said secondary source, means for thereafter controlling the frequency of said master source in accordance with said control signal, and means for inserting additional pulses for storing information in said delay line.

6. A system in accordance with claim 5 wherein said comparison circuit includes AND-integrator circuit means for developing a control signal proportional to the width of the overlap between said index pulse and said periodic pulses from said secondary source.

7. In a control circuit for synchronizing delay line storage systems, a delay line, a source of reference signals having a period of recurrence which is a multiple of the delay period of said delay line, means for inserting an index pulse in a single time slot of said delay line, means for comparing said index pulse from said delay line with a reference signal from said source and deriving a control signal therefrom, means for controlling the frequency of said source of signals in accordance with said control signal, and access circuit means for storing information pulses in the remaining available time slots of said delay line.

8. In a synchronous data storage system, a master source of periodic timing signals, a delay line for storing pulses, access circuit means for supplying pulses to said delay line in successive time slots having a spacing determined by said source of timing signals, means for initially energizing said access circuit means to insert a single reference pulse in said delay line, means for deriving from said source a periodic reference signal having a frequency of recurrence which is a submultiple of the frequency of the timing signals of said source, a comparison circuit for matching the reference pulse from said delay line with the reference signal from said source and deriving a control signal representing the magnitude and sign of the relative displacement in time of said pulse and said signal, means for initially sweeping the frequency of said source of timing signals to obtain overlap of said pulse and said signal, means for subsequently controlling the frequency of said source in accordance with said control signal, and means for thereafter energizing said access circuits to insert additional pulses into said delay line.

9. A system in accordance with claim 8 wherein said means for initially sweeping the frequency of said source of timing signals includes a capacitor and resistance means.

10. A system in accordance with claim 8 wherein said means for initially inserting a single index pulse includes a single pulse generator and a digital extender, said digital extender including a phase compensation circuit.

11. In a synchronous delay line memory system, a delay line, a master source of periodic timing signals including a reactance tube oscillator, a source of reference pulses derived from said master source and having a period of recurrence approximately equal to the delay time of said delay line, means for initially inserting a single index pulse in said delay loop, a comparison circuit for comparing said index pulse with said reference pulses and deriving a control signal therefrom representing the magnitude and sign of the relative displacement in time of said index and reference pulses, means for initially sweeping the frequency of said source of timing signals to obtain overlap of said index and reference pulses, means for subsequently controlling said frequency in accordance with said control signal, detector circuit means for indicating the absence of said index pulse from its proper time slot in said delay line, and access circuit means for storing information in and reading information out of said delay line.

12. In a synchronous data storage system, a master source of timing signals, a delay line, a source of periodic reference pulses having a period of recurrence approximately equal to the delay period of said delay line, means for inserting an index pulse derived from said source of reference pulses into said delay line, a comparison circuit for deriving a control signal representing the relative displacement in time of said reference and index pulses, means for initially varying the frequency of said master source to obtain overlap of said index and reference pulses, means for subsequently controlling the frequency for said master source in accordance with said control signal, and means for thereafter storing additional pulses in said delay line.

13. In a data storage system, a delay loop, a master source of periodic timing signals for providing digit period signals for said data storage system, means for inserting an accurately timed index pulse in said delay loop at time intervals approximately equal to the delay of the delay loop, means for providing a periodic reference signal having a frequency of recurrence which is a submultiple of the frequency of said source of timing signals, circuit means for comparing said index pulse from said delay loop with said periodic reference signal and developing a control signal representing the magnitude and sign of the relative displacement in time of said index pulse and said reference signal, means for shifting the rate of insertion of said index pulse progressively through a range extending over a plurality of digit periods, means for subsequently controlling the frequency of said source of timing signals in accordance with said control signal, and means for storing digital information in the remaining digit spaces in said delay loop.

References Cited in the file of this patent

UNITED STATES PATENTS

| | | |
|---|---|---|
| 2,629,827 | Eckert et al. | Feb. 24, 1953 |
| 2,783,455 | Hindall | Feb. 26, 1957 |

FOREIGN PATENTS

| | | |
|---|---|---|
| 163,776 | Australia | June 30, 1955 |